United States Patent [19]

Kerr et al.

[11] 4,221,966
[45] Sep. 9, 1980

[54] INFRARED SURVEILLANCE SYSTEM

[75] Inventors: Howard S. Kerr, Scarborough; John R. Kettlewell, Brampton, both of Canada; John B. Driffield, deceased, late of Toronto, Canada; Margaret D. Driffield, administrator, Lisle, Canada

[73] Assignee: Spar Aerospace Limited, Toronto, Canada

[21] Appl. No.: 17,761

[22] Filed: Mar. 5, 1979

Related U.S. Application Data

[63] Continuation-in-part of Ser. No. 809,199, Jun. 23, 1977, abandoned.

[51] Int. Cl.² ............................................. G01J 1/00
[52] U.S. Cl. .................................... 250/338; 250/342; 250/349
[58] Field of Search .............. 250/338, 341, 342, 352, 250/349; 350/200

[56] References Cited

U.S. PATENT DOCUMENTS

| | | | |
|---|---|---|---|
| 2,966,591 | 12/1960 | McCartney | 350/200 |
| 3,542,477 | 11/1970 | Grey | 250/342 |
| 4,041,314 | 8/1977 | Oppelt | 250/352 |

Primary Examiner—Alfred E. Smith
Assistant Examiner—Janice A. Howell
Attorney, Agent, or Firm—Fetherstonhaugh & Co.

[57] ABSTRACT

An optical system for infrared detection in the 3 to 14 micrometer region comprising: a viewing aspheric corrector, a spherical mirror having a focal length, said spherical mirror being positioned to receive the light passed by said viewing aspheric corrector, a plurality of detector cells comprising an array thereof sufficient to vertically scan an image to provide high resolution and positioned to lie at the focal length of said optical system behind a narrow pass spectral filter, said detector cells being adapted to produce an electrical signal responsive to the infrared radiation detected thereby, means for moving the system field of view in azimuth, a multiplexer to scan the array of cells and deliver their signals sequentially to an image display, and a cryogenic cooling system for cooling the filter and the cells.

15 Claims, 9 Drawing Figures

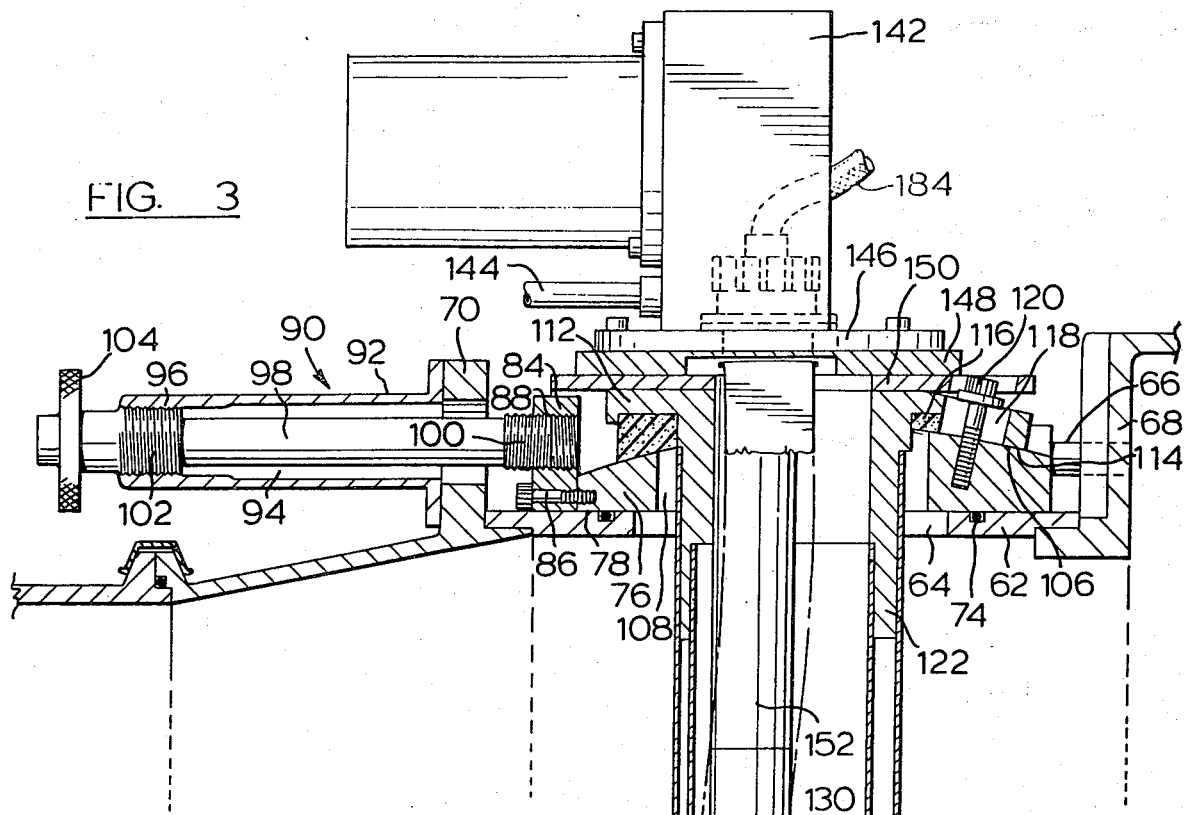
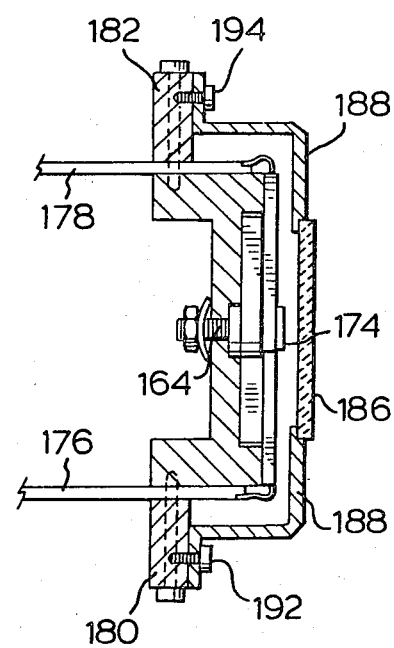
FIG. 3
FIG. 5 a/ modified ppi or ρθ format b/ x-y format

Spectral Filter Full Width Half Maximum (FWHM) Definition

INFRARED SURVEILLANCE SYSTEM

This is a continuation-in-part of our copending application Ser. No. 809,199, filed June 23, 1977, and entitled Infrared Surveillance System, now abandoned.

This invention relates to infrared surveillance systems. In particular, this invention relates to an optical system for infrared detection of targets and infrared imagery.

PRIOR ART

Present infrared detection systems for the acquisition of target positional information may be divided into two general classes namely, passive systems and active systems. The most common of these, the passive system, utilizes only the radiation emitted by the target to supply the input signal. The more complicated active system, irradiates the target with an auxiliary source of infrared. An important disadvantage of the active system, from the military point of view, is that it can betray its location to an enemy. Although the present invention is applicable to both systems, the system of the preferred embodiment, herein described, is a passive system.

Passive infrared surveillance systems comprise, essentially, an optical scanning unit which receives infrared emission from all objects in its field of vision, an infrared detector of the class of materials which produce a small emf proportional to the amount of radiation received, and which includes lead sulphide, indium antimonide, mercury cadmium telluride, infrared charge coupled detectors and others; an electronic amplifying system including an electrical filter; a signal processor and a visual display system for positional plotting of the signals. The main disadvantage with these known systems is the difficulty experienced by the operator in discriminating between signals generated by a genuine target such as an aircraft, and spurious signals, generated by background "noise", which clutters the display screen. Such "noise" is produced by emission from matter in suspension in the atmosphere such as clouds and the like and which also reflect sunlight, as well as from many different sources near the horizon.

SUMMARY OF THE INVENTION

The infrared surveillance system of the present invention includes an optical system which provides improved discrimination between target and background signals.

According to one aspect of the present invention, an optical system for infrared detection in the 3 to 14 micrometer region comprises a viewing aspheric corrector, a spherical mirror having a focal length, said spherical mirror being positioned to receive the light passed by said viewing aspheric corrector, a detector array including multiple detector cells, including at least 50 cells, positioned to lie at the focal length of said mirror, said detector cells being adapted to produce individual electrical signals responsive to the infrared radiation detected thereby, means for moving the system field of view in azimuth, and multiplexer means operative to reduce said individual signals to sequential trains of signals, which trains are brought out of the rotating system through a slip ring assembly.

Preferably the viewing aspheric corrector is a germanium aspheric corrector.

According to a further aspect of the present invention, there is provided a removable double-walled vacuum dewar which encloses the array of detectors and which is removable to permit servicing of the detector cells. An infrared transmitting window opens through the walls of the dewars to enable infrared radiation to reach the detectors. The detectors are removable from the dewar without affecting the vacuum integrity of the dewar.

The invention will be more clearly understood with reference to the following detailed specification read in conjunction with the drawings wherein:

THE DRAWINGS

FIG. 3 is an enlarged detailed section of the detector illustration in FIG. 2;

FIG. 5 is a sectional view in the direction of the arrow 5—5 of FIG. 4 showing the manner in which the detector chips are mounted and the filter which is located in front of the detector chips.

Figure 1:
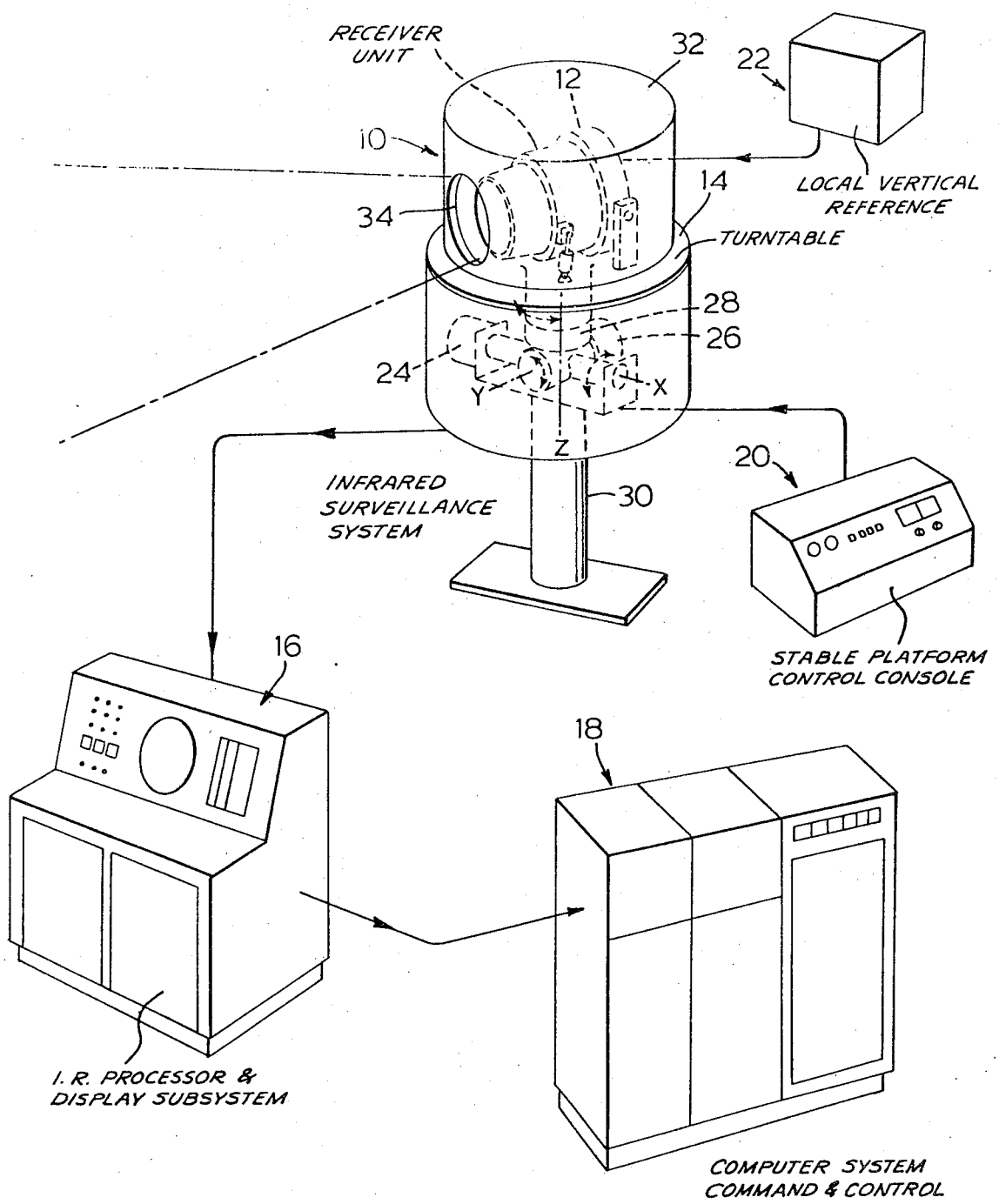
FIG. 1 is a diagrammatic illustration of an infrared surveillance system.

With reference to the drawings, FIG. 1 diagrammatically illustrates an infrared surveillance system according to an embodiment of the present invention. The system includes a scanning unit generally identified by the reference numeral 10. The scanning unit 10 comprises an optical receiver 12 which is mounted on a stable platform 14. The stable platform 14 is rotatably driven as will be described hereinafter to cause the scanning unit to rotate in azimuth. The electrical signals from the optical receiver 12 are transmitted to an infrared processer and display sub-system 16 which in turn provides an output to a command and control computer system 18. The stable platform 14 is controlled by a control console 20. A local vertical reference 22 is employed in order to maintain the vertical orientation of the scanning unit 10.

Figure 6:
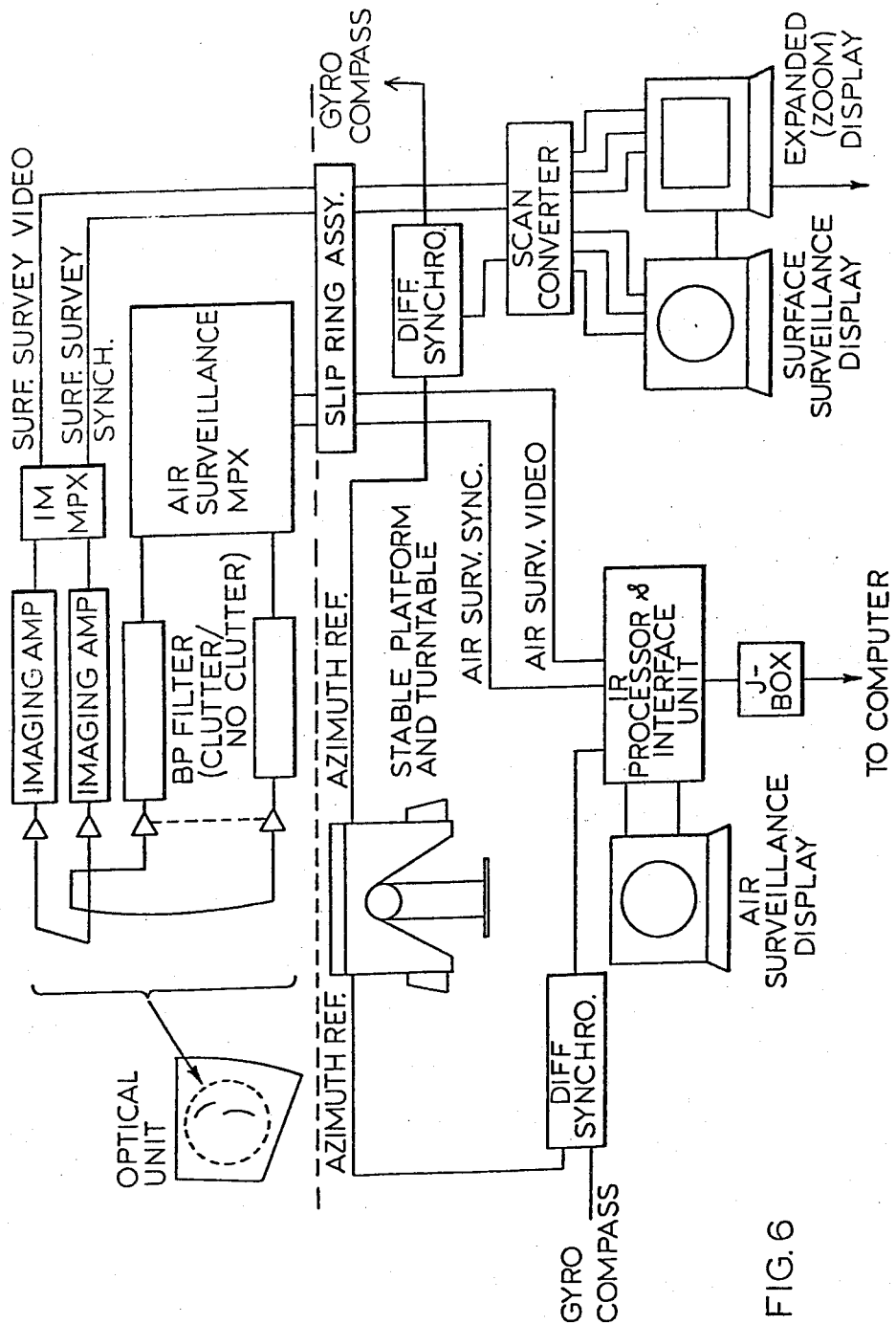
FIG. 6 is a block diagram of the infrared surveillance system according to an embodiment of the present invention.

The stable platform 14 is mounted so as to be rotatably driven about orthogonally arranged X, Y and Z axes by means of tilt drive motors 24 and 26 and the optical system is rotated in azimuth about a joint 28 which contains an azimuth drive motor, and a slip ring assembly as shown in FIG. 6. The control console 20 serves to maintain the required vertical orientation of the scanning unit 10 for all positions of the support structure 30. It will be understood that the support structure 30 may be an integral part of a surveillance structure and may be stationary, in which case the stable platform 14 will not be required or movable and may be based on land or sea. The optical receiver 12 is mounted in a cover 32 which has a viewing window 34 opening outwardly therefrom and which rotates with the optical receiver 12.

Figure 2:
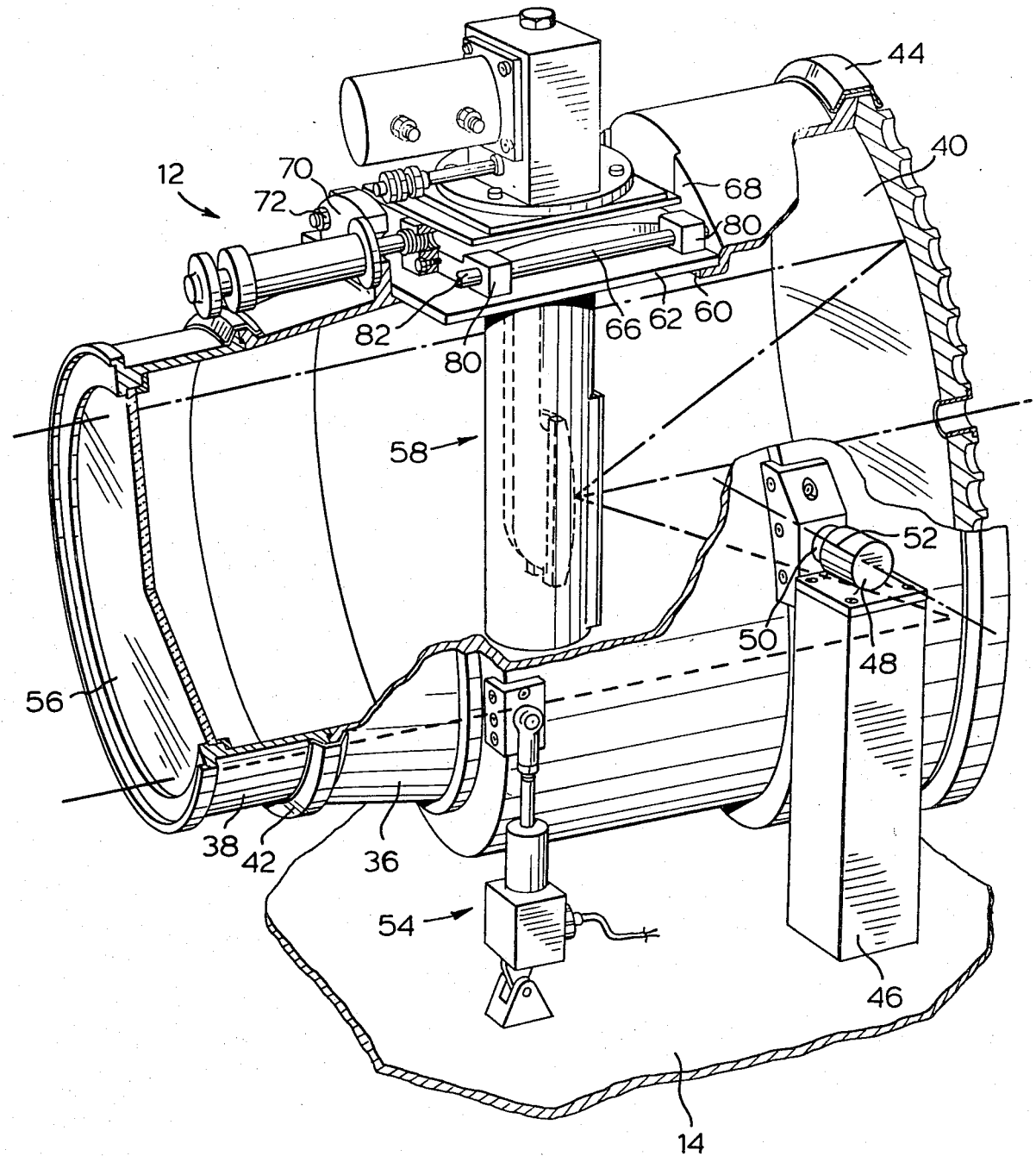
FIG. 2 is a partially sectioned pictorial view of an infrared optical unit according to an embodiment of the present invention.

With reference to FIG. 2 of the drawings, it will be seen that the optical receiver 12 consists of an optical housing 36 which has an aspheric housing 38 at one end thereof and a spherical mirror 40 at the other end thereof. The aspheric housing 38 and the spherical mirror 40 are releasably secured with respect to the optical housing 36 by clamping bands 42 and 44 respectively. A pair of support columns 46 (only one shown) extend upwardly from the stable platform 14 and are arranged one on either side of the optical housing 36. A bearing 48 is mounted at the upper end of each support column 46. A pair of transverse support shafts 50 are mounted one on either side of the optical housing 36 and are journalled in the bearings 48. The shafts 50 have a longitudinal axis 52. The optical housing 36 is movable about the axis 52 by means of an elevation and tilt adjustment mechanism generally identified by the reference numeral 54. The elevation and tilt adjustment mechanism 54 has one end secured with respect to the stable platform 14 and its other end is secured to the optical housing 36. The elevation and tilt adjustment mechanism is extendable and retractable to cause the optical housing 36 to pivot about the axis 52, as required for use.

An aspheric corrector 56 is mounted at the front end of the aspheric housing 38. Preferably the aspheric corrector 56 is made from optical germanium or silicon. Other suitable materials for use as an aspheric corrector include materials such as Irtran 1 and Zinc Selenide. The aspheric corrector 56 acts as a viewing window for the infrared optical receiver 12 and is shaped to correct the Schmidt optical system for spherical aberration.

The detector mechanism, generally identified by the reference numeral 58, is mounted in a wall of the optical housing 36 in a manner such that its position in relation to the spherical mirror may be longitudinally and angularly adjustable. A passage 60 opens through the wall of the optical housing 36 and a support plate 62 is located in a position overlying the passage 60. The support plate 62 has a passage 64 (FIG. 3) opening therethrough. Two guide rails 66 are mounted on the optical housing 36 and extend above the support plate 62 in a spaced parallel relationship. One end of each of the guide rails 66 is located in the radially extending face 68 of the optical housing 36 and the other ends thereof pass through the radially extending flange 70 and are secured by nuts 72. A sealing ring 74 is located in a circular channel extending around the passage 64 of the support plate 62. A slide member 76 has a lower face 78 resting on the upper face of the support plate 62 and bearing against the sealing ring 74. The slide member 76 has two pairs of lugs 80 projecting outwardly from opposite sides thereof. The lugs 80 have passages 82 formed therein which are adapted to receive the guide rails 66 in a close fitting sliding relationship. The slide member 76 is shorter than the guide rails 66 so as to be movable longitudinally thereof. An end plate 84 is mounted at the front end of the slide member 76 and is secured thereto by mounting screws 86. The end plate 84 has a threaded passage 88 opening therethrough.

The adjustment mechanism for adjusting the longitudinal position of the slide member 76 is generally identified by the reference numeral 90 of FIG. 3. The adjustment mechanism 90 consists of a tubular housing 92 which has one end mounted on the flange 70. The housing 92 has a passage 94 opening therethrough. The outer end portion 96 of the passage 94 is threaded with a thread of an opposite hand to that formed in the passage 88 of the end plate 84. A drive shaft 98 has a threaded portion 100 at one end thereof adapted to threadably engage the threaded passage 88 of the end plate 84. The shaft 98 also has a threaded portion 102 adjacent the other end thereof which is threadably mounted in a threaded end portion 96 of the housing 92. A hand wheel 104 is formed at the outer end of the shaft 98. The drive shaft 98 forms a differential screw which upon rotation of the hand wheel 104 moves the slide member 76 to move the detector 58 towards and away from the spherical mirror as required for use. The slide member 76 has an upper surface 106 which has a front to back arcuate curvature. A passage 108 opens through the slide member 76.

The dewar assembly, generally identified by the reference numeral 110, has a flange 112 at the upper end thereof which is located above the slide member 76. The flange 112 has a lower face 114 formed with a curvature conforming to the curvature of the upper face 106 of the slide member 76. A resilient seal 116 extends around the dewar 110 below the flange 112 and has an arcuate shaped lower face resting on the arcuate surface 106 of the slide member 76. A plurality of front to back elongated slots 118 are formed in the flange 112 and the flange 112 is secured with respect to the slide member 76 by mounting screws 120 which extend through the passages 118 and are threadably located in the slide member 76. The angular position (tilt) of the dewar 110 can be adjusted by releasing the clamping screws 120 and moving the flange 112 relative to the slide member 76 along the arcuate path formed by the upper surface 106 of the slide member.

Figure 4:
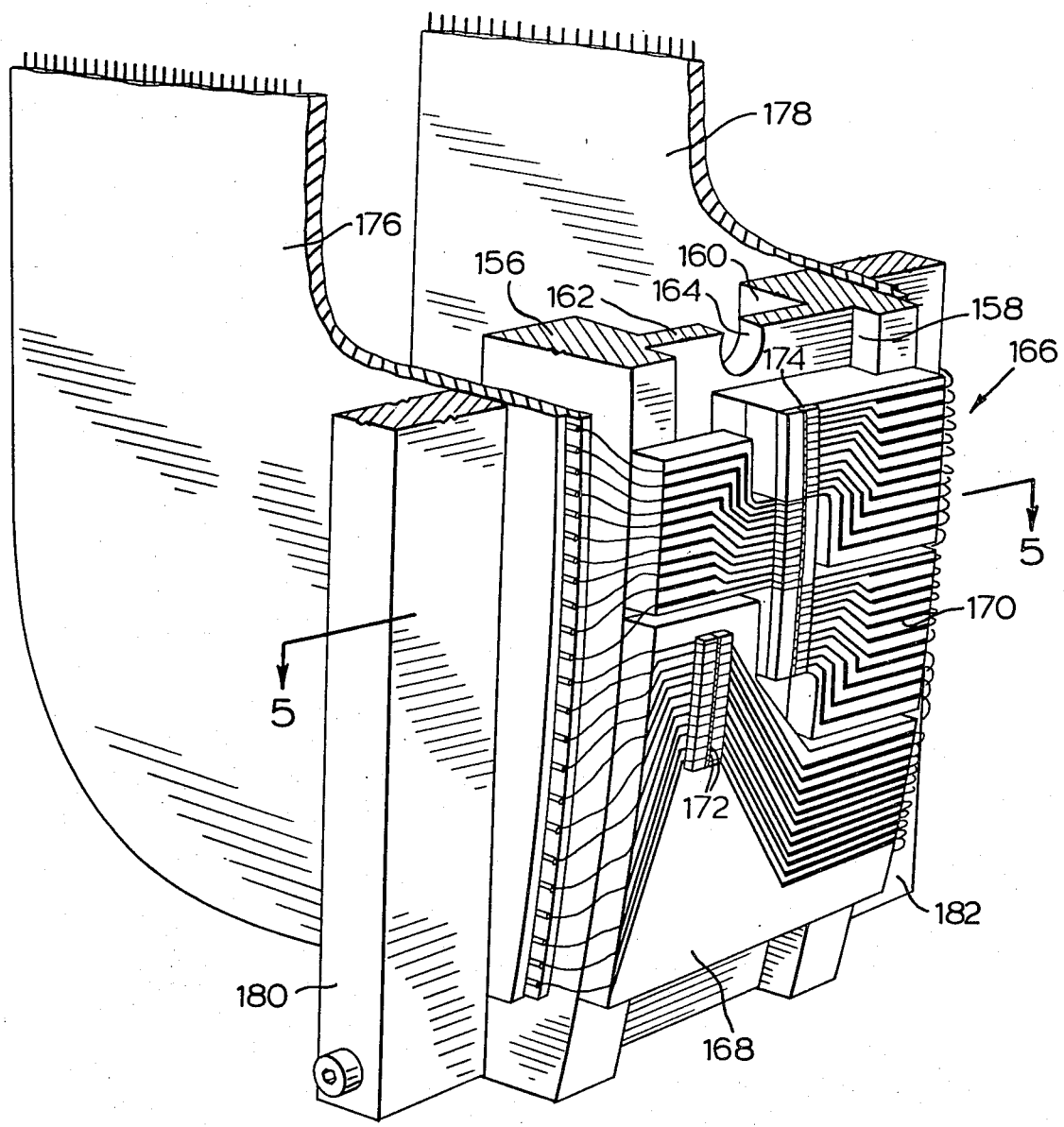
FIG. 4 is an enlarged detailed view of a portion of the detector array of FIG. 3.

The dewar 110 has a head portion 122, an inner cylindrical wall 124 and an outer cylindrical wall 126. The walls 124 and 126 have window openings 128 and 130, respectively, within which window units 132 and 134 are located. The window units 132 and 134 are germanium window units (3–14 $\mu$m) or sapphire (3–5 $\mu$m) to allow the infrared radiation to pass therethrough. The window frames 128 and 130 are preferably brazed to the stainless steel walls of the vacuum dewar within which they are mounted. The chamber 136 which is formed between the walls 124 and 126 is evacuated through an evacuation spigot 138. The chamber 140 which is located inwardly of the inner wall 124 is filled with an inert gas (nitrogen). (This is true but incidental). The cooling system is connected to a suitable compressor by means of a conduit 144. The cryogenic engine 142 is mounted on a support platform 146 which is in turn carried by a face plate 148 which is mounted on plate 150 which rests on the upper end portion 122 of the dewar. Tubular probe 152 is mounted on the platform 146 and extends downwardly therefrom into the chamber 140. The probe 152 is cooled by circulating a refrigerant therethrough so as to cool the support bridge 156 and the array of detectors 166 and filter 186. An end support 154 is located at the lower end of the tubular probe 152. A bridge member 156 is mounted on the end support 154 and extends longitudinally thereof in alignment with the windows 132 and 134 of the dewar. As shown in FIG. 4 of the drawings, the bridge support member 156 has a U-shaped channel 158 located on the outer face thereof and a U-shaped channel 160 located on the inner face thereof. A web 162 forms the base of the U-shaped channels 158 and 160. A plurality of passages 164 open through the web 162 for use in mounting the detector cell chips such as the chip 174 as shown in FIG. 5. The detector array 166 consists of a single surface surveillance (imaging) detector array 168 including the chips 172, and a plurality of air surveillance detector chips 174 in the array 170. The surface surveillance (imaging) detector array 168 is located at the upper end of the bridge 156, and the air surveillance detector array 170 includes the chips 174 which are located one on top of the other along the length of the bridge 156. The number of air surveillance chip members employed is determined by the arc of elevation scan, at least 10 detector cells per degree of elevation being required in use. The detector chips 172 of the surface surveillance (imaging) detector 168 are mounted on the bridge 156 so as to be located along the same focal plane. The air surveillance detectors 174 operate in the 3–5 μm region and may be made from photovoltaic indium antimonide (InSb) or the like. The surface surveillance (imaging) detectors 168 are preferably made from HgCdTe (MCT) or PbSnTe (photovoltaic). The array combination of surface surveillance (imaging) detectors 172 (FIG. 4) and of air surveillance detectors 174 on the same focal plane of the bridge permits the apparatus of the present invention to operate in two different modes, i.e. as both a surface surveillance (imaging) device and an air surveillance device. The detectors 172 and 174 are connected to flat conductor cables 176 and 178 at opposite sides of the bridge 156. Support blocks 180 and 182 serve to clamp the flat cables 176 and 178 against the side of the bridge 156. The flat cables 176 and 178 extend upwardly within the chamber 140 and open outwardly therefrom through the plate 148 to be electrically connected to a signal outlet cable 184.

Presently manufactured embodiments of the invention use detector chips of the charge coupled type, having angular resolution of 0.5 milliradian or better. One hundred fifty to two hundred detectors are used currently, but it is expected that this number will be doubled in the foreseeable future to achieve even higher resolution.

Figure 9:
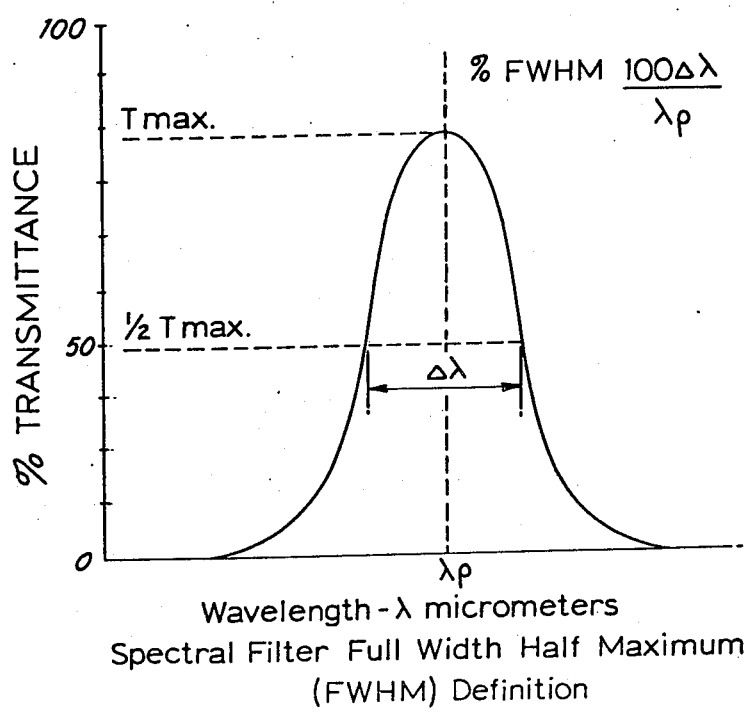
FIG. 9 is a diagram illustrating the definition of the term FWHM, full width half maximum, as applied to the spectral filter.

An extremely narrow band spectral filter 186 (FIG. 5) is mounted between the detectors 174 and inner window means 132 by means of a support bracket 188 which is mounted on support members 180 and 182 respectively by mounting screws 192 and 194 respectively. The extremely narrow band spectral filter (less than 3% full-width-half-maximum (FWHM), FIG. 9) provides extreme background rejection for target enhancement for the air surveillance mode. The spectral filter 186 is attached to the bridge 156 which is cooled as previously described and because the filter is cooled, it provides an improvement in the noise equivalent irradiance (NEI) performance of the system because of the lower background photon noise radiated by the filter itself to the detector array. This in turn provides greater target range performance for the system as a whole.

Typical parameters for an infrared surveillance system according to an embodiment of the present invention are set forth in Table I below:

TABLE I

| IRSS SYSTEM PARAMETERS (TYPICAL) AIR SURVEILLANCE DETECTION SUBSYSTEM | |
|---|---|
| Parameter | |
| Scan Rate | 30–40 RPM |
| Aperture Diameter $D_o$ | 10 inches |
| F/Number N | 1.0 |
| Detector Type | Photovoltaic Indium Antimonide (InSb) |
| Cooling System | Gifford-McMahon Closed Cycle Mechanical Cooler |

TABLE I-continued

| IRSS SYSTEM PARAMETERS (TYPICAL) AIR SURVEILLANCE DETECTION SUBSYSTEM | |
|---|---|
| Parameter | |
| Detector Temperature | 77° K. |
| Spectral Filter, Δλ | In the 3–5 μm region (1% to 20%) at 50% points |
| Total Elevation Field | Variable depending on application |
| Resolution Azimuth | ←<2 mr→ |
| Elevation | Variable up to 3 mr |
| Number of Detectors | Variable depending on elevation field, but requires at least 10 detector cells per degree of elevation field |

| SURFACE SURVEILLANCE AND IMAGING SUBSYSTEM | |
|---|---|
| Parameter | Value |
| Detector Type | HgCdTe (MCT) or PbSnTe (photovoltaic) |
| Spectral Filter Δλ | 8–14 μm |
| Total Elevation Field | Variable |
| Resolution Azimuth | ←<1 mr→ |
| Elevation | Variable up to 2 mr |
| Number of Detectors | Variable, but will require at least 32 detectors. Using a type which gives 0.5 milliradians angular resolution, 32 such detectors would cover about 0.92 degree of elevation field. In a practical array, several hundred such detectors would provide a high resolution image. |

In use, the detector cells 172 and 174 are disposed in a curved array surface which is to lie at the focal length of the optical system by adjustment 104 of the position of the dewar as previously described. The elevation of the optical receiver 12 can be adjusted to extend the elevation coverage by adjustment of the mechanism 54. The scanning unit 10 is rotated to cause the optical receiver to scan in azimuth. Infrared signals passed by the aspheric corrector 56 are reflected by the spherical mirror 40 through the window 134 and 132 of the dewar and through the narrow band spectral filter 186 to impinge on the detectors 172 and 174. The output signals from the detectors 172 and 174 are transmitted by way of flat conductor cables 176 and 178 and cable 184 to separate preamplifiers and electrical filters mounted on the optical housing. These signals are then multiplexed out to the infrared processer and display sub-system 16 (FIG. 1).

An important feature of one aspect of the present invention is in the provision of both air surveillance mode detectors 174 and surface surveillance mode detectors 172 in a combined array lying along the same focal surface of the spherical mirror. This permits the apparatus to be used simultaneously in both an air surveillance mode and a surface surveillance mode for detecting airborne targets and surface targets, respectively.

A further important feature is the provision of a cooled filter 186 which is placed between the mirror and the detectors. The filter is cooled by reason of the fact that it is attached to the bridge 156 which is cooled by the cooling probe 152 previously described. In use, the detector/filter bridge 156 is cooled to operate at liquid nitrogen temperature (77° K.). The spectral filter 186 may be an extremely narrow band (<3%) or extend over broadband.

The structure of the double dewar offers a number of important features. In particular, it will be noted that the structure of the dewar is such that the detectors may be removed from the compartment 140 without breaking into the vacuum system. The double-walled vacuum dewar is evacuated to provide a high thermal insulating shield around the detector assembly and it will be noted that the vacuum dewar 11 is completely separate from the detector assembly. As previously indicated, the chamber 140 is filled with an inert gas (dry nitrogen) at one atmosphere. Because of the construction of the dewar and detector assembly, the detector assembly may be removed from the dewar for servicing and replaced therein after servicing and merely requires the chamber 140 to be purged with dry nitrogen to make the system fully operational. This technique of completely separating the vacuum dewar from the detector array allows high bake-out temperatures during the high vacuum processing of the dewar with the result that the dewar is a long life static high vacuum system. The walls 124 and 126 of the dewar are preferably made from stainless steel.

As previously indicated, the windows 132 and 134 are preferably germanium (3—14μm) or sapphire (3—5μm) which allow the infrared radiation to pass therethrough to the detectors. Preferably the windows 132 and 134 are brazed into their frames 128 and 130 respectively.

As previously indicated, the cryogenic engine 142 circulates the cooling medium through the cooling probe 152 to cool the bridge 156. This cooling system also serves to cool the structural filter 186. The cooling system employs helium refrigeration of the type manufactured and distributed by CRYOGENIC TECHNOLOGY INC. of Waltham, Mass. under the trade name CRYOGENIC.

Signals from the detectors are brought out to preamplifiers outside the dewar using the flat conductor cables 176 and 178. The flat conductor cables have been designed to provide a high density lead-out capability, a low heat leak to the detector cold probe 152, spacing and lead size to ensure low cross talk and ground shields are provided to sandwich the leads to minimize microphonics and electromagnetic interference. The flat conductor cables are connected to the detector modules positioned on the detector bridge by a conventional soldering technique. Separate lines are used for each detector with a separate ground lead for each detector module. The leads for the air surveillance and surface detectors are connected to their respective preamplifiers located externally of the optical housing.

The narrow band spectral filter 186 is made up of a plurality of flat filter elements mounted on the support members 188. The filter is extremely narrow band (less than 3% FWHM) about a predetermined wavelength in the 3–5 micrometer band and because of its low temperature, it reduces the background induced photon noise in the detector material. Broad waveband operation in the 3–5 μm region can also be used. A separate filter for the 8–14 μm region is mounted above the surface surveillance detector 168.

Preferably the optical housing 36 and aspheric housing 38 are made from an aluminum alloy and the thermal compensator and focus adjustment mechanism is made from stainless steel and vespel. The spherical mirror 40 is preferably made from beryllium or aluminum. The optical surface of the spherical mirror 40 is coated with nickel phosphide (electrodeless nickel) and is ground and polished, aluminized (or gold coated) and given an overcoat of silicon monoxide (the latter is not used for gold coating). For maximum reflectance in the wavelength region 3–5 and 8–14 micrometers. When the mirror is made from aluminum and the main housing is made from aluminum, the position of the focal point will remain at its designed position at all thermal levels due to thermal scaling effect. In this case thermal compensation is not required. When the mirror is made from beryllium thermal compensation is required and this is incorporated in the focusing adjustment device 90 as detailed above. The aspheric housing 38 is made from aluminum and the aspheric corrector 56 is made from optical germanium or silicon. The optical silicon and germanium have a cut-in wavelength of approximately 1 and 2 micrometers respectively, radiation of shorter wavelength is excluded from the system by the aspheric corrector and this reduces spurious detector response and DC background photon levels.

The electronic amplification of the signal process is shown in the system block diagram of FIG. 6 of the drawings. Separate preamplifiers are employed for each air surveillance and surface surveillance detector cell. The preamplifiers also incorporate two selectable frequency bandwidth filters to provide background rejection (clutter reject mode) and broadband (no clutter mode) filtering, the latter providing greater air target range performance for clear background conditions.

The individual analogue signals as sampled on the array are then cyclically multiplexed so that the individual cell signals are reduced to sequential trains of signals for transmission through the rotating table joint slip ring assembly and then delivered to the infrared signal processer and the display console.

The infrared signal processer performs electronic processing on the multiplexed video to further reduce background (clutter) signals using CFAR (constant false alarm rate) and correlation techniques.

Figure 7:
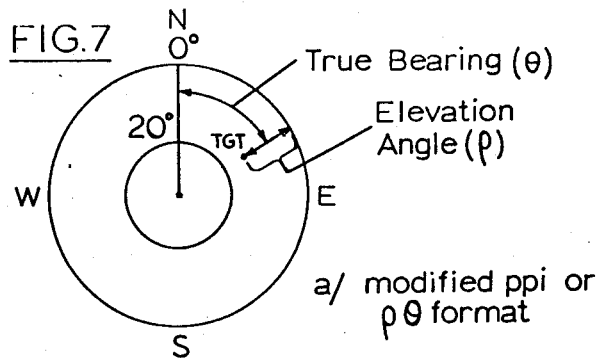
FIG. 7 is a diagram illustrating one display format of the infrared surveillance system.
Figure 8:
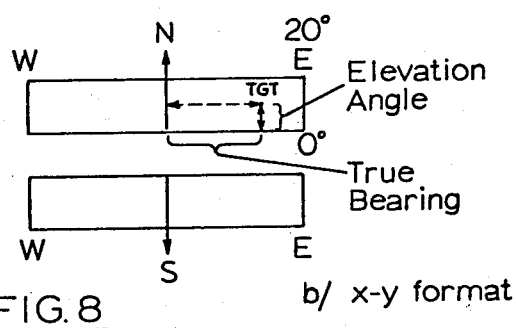
FIG. 8 is a diagram illustrating an alternative display format.

The display format utilized in the infrared surveillance system of the present invention can be in two forms. These forms are illustrated in FIGS. 7 and 8 of the drawings. One is a modified PPI or $\rho\theta$ (rho theta) format where the azimuth angle is the polar coordinate angle $\theta$ and elevation is the radius coordinate $\rho$ as measured from the outside edge of the display face (FIG. 7). The outside rim is the horizon (approximately) and in the case of a shipborne installation the top of the display will be the true north bearing. The operator can designate a target by placing a cursor around the spot on the display which will automatically provide target coordinates to the Fire Control System.

The alternate display, which operates in a similar fashion with respect to target designation is one employing an X, Y coordinate, or vertical and horizontal, scan format. This is shown in FIG. 8.

In both display systems the frame time for one complete azimuth scan is around 1 to 1.5 seconds. These frames can be displayed on a conventional TV display by using a scan converter. This provides a display which can be used under higher ambient light conditions.

In addition to the above displays, the system also has an expanded (zoom) display for working with the surface surveillance mode.

We claim:

1. A high-resolution optical system for detection of an object by detecting infrared radiation therefrom in a wide wavelength band within 3 to 14 micrometers, comprising:
   (a) optical means for focusing said radiation on a focal surface, and including a spherical mirror spaced by its focal length from said surface and including a Schmidt aspheric corrector located between the object and the mirror;

(b) a radiation detector array comprising at least 50 radiation detector cells positioned to lie in said focal surface and having electrical connections extending from each of the cells to deliver separate signals in response to radiation focused on the individual cells;

(c) system support means operative to move said optical means with respect to the azimuth, the support means including a slip ring assembly operative for sequentially transferring signals from said electrical connections to a location outside of said support means; and (d) multiplexer means connected to scan said electrical connections in a repeating cycle to reduce the separate signals from the detector cells to sequential trains of signals connected to said slip ring assembly.

2. An optical system as claimed in claim 1, wherein said means to move said optical means is operative to provide continuous rotation thereof at a rate of at least 30 r.p.m.

3. An optical system as claimed in claim 1, wherein said aspheric corrector is a high refractive index germanium aspheric corrector located at the center of curvature of the mirror.

4. An optical system as claimed in claim 1, wherein said mirror is an aluminum mirror coated to provide maximum reflectivity in the wavelength region of 3 to 14 micrometers.

5. An optical system as claimed in claim 1, wherein said detector array comprises an indium antimonide array operative in the 3 to 5 micrometer range to provide an air surveillance mode of operation.

6. An optical system as claimed in claim 1, wherein said detector array comprises a mercury cadmium telluride array operative in the 8 to 14 micrometer wavelength region to provide a surface surveillance mode of operation.

7. An optical system as claimed in claim 1, wherein said detector array comprises an indium antimonide array and a mercury cadmium telluride array which together are operative in a 3 to 14 micrometer wavelength region to provide both an air and a surface surveillance mode of operation.

8. An optical system as claimed in claim 1, including spectral filter means positioned between said detector array and said mirror, and cryogenic means for cooling said spectral filter means and said detector array to a temperature where photon noise incident upon the detector cells from the filter means is reduced to improve the Noise Equivalent Irradiance of the system.

9. An optical system as claimed in claim 8, wherein said spectral filter has a spectral bandpass of less than three per cent Full-Width-Half-Maximum to provide high background rejection for target enhancement of the air surveillance mode.

10. An optical system as claimed in claim 1, wherein said radiation detector cells are charge-coupled-device detectors operative in the 3 to 5 micrometer and the 8 to 14 micrometer spectral region.

11. An optical system as claimed in claim 1, including a support for said detector cells, the cells being arranged in a plurality of modular units each comprising a plurality of detector cells and each modular unit being individually replaceably mounted on said support.

12. An optical system as claimed in claim 1, including a double-walled vacuum dewar having an inner wall and an outer wall, the inner wall enclosing said detector array and the outer wall enclosing the inner wall, the space between said inner and outer walls being evacuated, infrared transmitting window means through said inner and outer walls to enable the infrared radiation to reach the detector array, said detector array being in an inert gas at approximately one atmosphere pressure, and the dewar having means for removing the detector array from the dewar without affecting the vacuum integrity of the dewar, and means for cooling said inert gas.

13. An infrared surveillance system comprising an optical system for infrared detection as claimed in claim 1, and electronic processing means connected to the slip ring assembly to receive said trains of signals, the processing means including means to display target data of high resolution and accuracy as a function of target azimuth and elevation.

14. An optical system as claimed in claim 1, further including means for displaying an image of said object and having a vertical and horizontal scan, the radiation detector cells each having an angular resolution of 0.5 milliradians or better to provide high image resolution and being disposed in a narrow substantially vertical series along said focal surface, the multiplexer means sequentially scanning and electrical connections and providing a vertical scan synchronizing signal for said display means, and said system support means moving the optical means in azimuth and providing an azimuth reference signal for synchronizing the horizontal scan of said display means.

15. An optical system as claimed in claim 1, further including means for displaying an image of said object and having a $\rho\theta$ scan, the radiation detector cell each having an angular resolution of 0.5 milliradians or better to provide high image resolution and being disposed in a narrow substantially vertical series along said focal surface, the multiplexer means sequentially scanning said electrical connections and providing a $\rho$ scan synchronizing signal for said display means, and said system support means moving the optical means in azimuth and providing an azimuth reference signal for synchronizing the $\theta$ scan of said display means.

* * * * *